United States Patent
Vervoorn et al.

(10) Patent No.: US 9,657,716 B2
(45) Date of Patent: May 23, 2017

(54) ROTATIONAL SUPPORT OF A WIND TURBINE BLADE

(75) Inventors: Dennis Vervoorn, Utrecht (NL); Koos Welling, Utrecht (NL); Jascha Van Pommeren, Utrecht (NL); Johannes Cornelis Theodorus Blom, AS Achterveld (NL); Peter Klein Meuleman, Venlo (NL)

(73) Assignee: AKTIEBOLAGET SKF, Gothenburg (SE)

(*) Notice: Subject to any disclaimer, the term of this patent is extended or adjusted under 35 U.S.C. 154(b) by 838 days.

(21) Appl. No.: 14/114,105

(22) PCT Filed: Apr. 27, 2012

(86) PCT No.: PCT/EP2012/057780
§ 371 (c)(1),
(2), (4) Date: Feb. 27, 2014

(87) PCT Pub. No.: WO2012/146722
PCT Pub. Date: Nov. 1, 2012

(65) Prior Publication Data
US 2014/0161614 A1  Jun. 12, 2014

(30) Foreign Application Priority Data
Apr. 27, 2011  (WO) .................. PCT/EP2011/002112

(51) Int. Cl.
*F03D 7/02* (2006.01)
*F03D 1/06* (2006.01)
*F03D 80/70* (2016.01)

(52) U.S. Cl.
CPC ......... *F03D 7/0224* (2013.01); *F03D 1/0658* (2013.01); *F03D 7/0228* (2013.01);
(Continued)

(58) Field of Classification Search
CPC .... F16C 17/02; F16C 17/04; Y10T 29/49643; Y10T 29/49645; Y10T 29/49696;
(Continued)

(56) References Cited

U.S. PATENT DOCUMENTS 5,173,023 A  12/1992 Pawlowski et al.
5,660,527 A  8/1997 Deering et al.

FOREIGN PATENT DOCUMENTS

DE  4432986 A1  11/1995
FR  811726 A  4/1937
WO  20070112748 A2  10/2007

*Primary Examiner* — Jermie Cozart
(74) *Attorney, Agent, or Firm* — Bryan Peckjian; SKF USA Inc. Patent Dept.

(57) ABSTRACT

The invention resides in an assembly for rotationally supporting a wind turbine blade (110) relative to a wind turbine hub (120). The assembly comprises an intermediate ring (130) having an inner annular portion and an outer annular portion provided with means for attaching the turbine blade. The intermediate ring is rotatably mounted to the hub via a first bearing arrangement. According to the invention, the first bearing arrangement comprises a radial bearing (140) and a thrust bearing, whereby the inner annular portion is mounted to the hub via the radial bearing and the outer annular portion is mounted to the hub via the thrust bearing. The thrust bearing is a plain bearing comprising first and second sliding surfaces (151, 152) which are clamped to the hub between first and second clamping members (161, 162).

16 Claims, 7 Drawing Sheets

(52) U.S. Cl.
CPC .......... *F03D 80/70* (2016.05); *F05B 2240/54* (2013.01); *Y02E 10/721* (2013.01); *Y02E 10/723* (2013.01); *Y10T 29/49645* (2015.01); *Y10T 29/49696* (2015.01)

(58) Field of Classification Search
CPC ........... Y10T 29/4971; Y10T 29/49316; F03D 7/024; F03D 7/0224; F03D 7/0228; F03D 80/70; F03D 1/0658; F05B 2240/54; F05B 2240/52; F05B 2260/79; F05B 2260/74
USPC .................................................. 384/420, 424
See application file for complete search history.

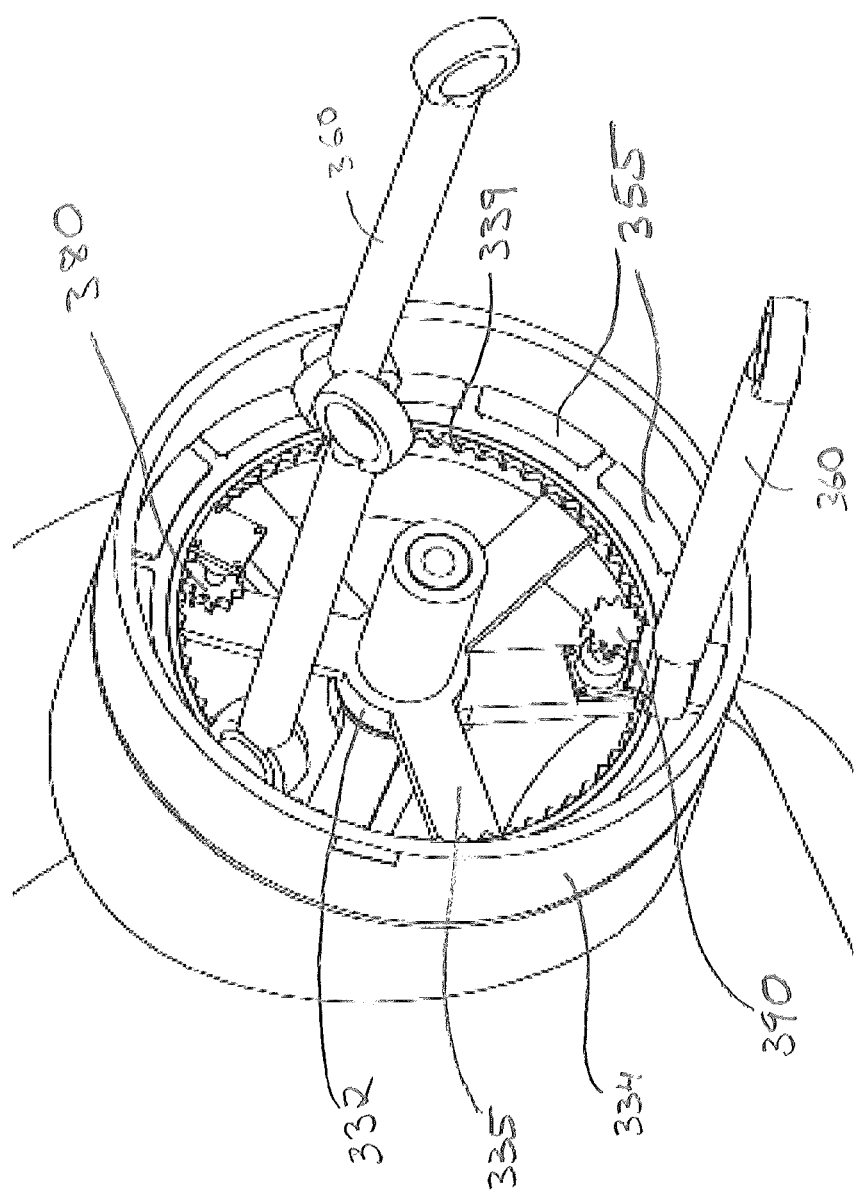

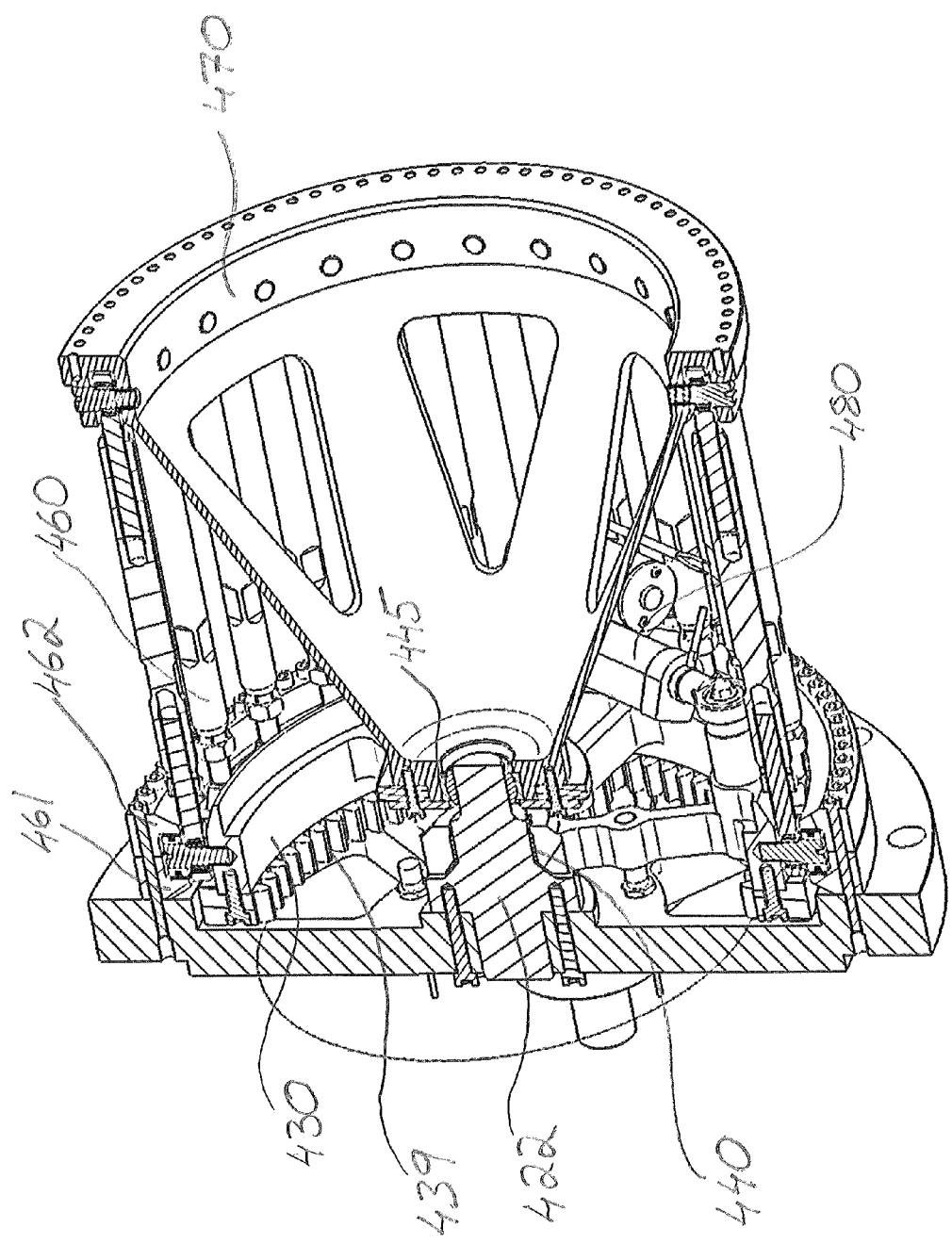

ROTATIONAL SUPPORT OF A WIND TURBINE BLADE

TECHNICAL FIELD

The present invention relates to a bearing assembly adapted to be used for the pitch adjustment of a wind turbine blade.

BACKGROUND ART

Wind turbines are designed to convert wind into electricity, by turning a generator positioned in a wind turbine housing, also known as a nacelle. The rotation of the generator is achieved by wind turbine blades, normally three, that rotate by the wind. In order to be able to optimize the output power of the wind turbine, the blades may be rotated around their longitudinal axis. In this way, the blades can be used to control the amount of wind power transferred from the wind to the generator.

In conventional wind turbines, a slewing bearing is often used for rotational support of each turbine blade. An outer ring of the bearing is mounted to the hub with many bolts, typically 50 to 80 bolts, which are pre-tensioned according to specification. When the blade is assembled, it is mounted to an inner ring of the bearing with a matching number of bolts that are also pre-tensioned according to specification. Such a bearing may be a roller bearing having a diameter in the same order as the outer diameter of the blade root. In pitch control, the angular adjustment is a back and forth oscillating motion, through angles much smaller than 360 degrees. A slewing bearing is not optimally adapted for oscillations, and is prone to wear and fatigue when used for active pitch control.

Also, the pitch bearing is exposed to several different kinds of load, both static and dynamic. The loads include radial and axial forces and a bending moment due to the length and mass of the blade. A further example of a pitch bearing is known from WO 2007/112748, which discloses a bearing with a first and second axial row of rolling elements and at least one radial row of bearing elements, positioned outside of an area defined by the first and second axial row. Such a bearing is better adapted for supporting a combination of axial and radial loads, but is not particularly suited for oscillating pitch motions and will therefore also be prone to fatigue and wear when employed for active pitch control.

Consequently, there is room for improvement.

DISCLOSURE OF INVENTION

The invention resides in an assembly for rotationally supporting a wind turbine blade relative to a wind turbine hub. The assembly comprises an intermediate ring having an inner annular portion and an outer annular portion provided with means for attaching the turbine blade. The intermediate ring is rotatably mounted to the hub via a first bearing arrangement. According to the invention, the first bearing arrangement comprises a radial bearing and a thrust bearing, whereby the inner annular portion is mounted to the hub via the radial bearing and the outer annular portion is mounted to the hub via the thrust bearing. The thrust bearing is a plain bearing comprising first and second sliding surfaces which are clamped to the hub between first and second clamping members.

The thrust bearing supports the axial loads and the blade bending moment. The inner and outer annular portions of the intermediate ring are connected by e.g. a plurality of spokes, which transmit the radial loads from the outer to the inner annular portion. The hub suitably comprises a shaft-like extension on which the inner annular portion of the intermediate ring is supported via the radial bearing, which transmits the radial load to the hub extension. Since the radial bearing need not take up any bending moment, the radial bearing may have a significantly smaller pitch diameter than the thrust bearing. Preferably, the pitch diameter of the radial bearing is at least five times smaller than the pitch diameter of the thrust bearing. The advantage of minimising the pitch diameter of the radial bearing is that friction torque is also minimised. The radial bearing may be a plain bearing, such as a simple bushing or may be a spherical plain bearing. It is also possible to use a rolling element bearing.

Given that the thrust bearing transmits the larger axial loads and blade bending moment to the hub, the thrust bearing must therefore possess high strength and stiffness, and excellent wear resistance. This is provided by the first and second sliding surfaces of the thrust bearing, which are suitably made from a robust and low-friction sliding material, such as a fibre-reinforced polymer material. A preferred sliding material is PA 6.6 comprising 15% PTFE and 30% glass fibres. Such a material is well able to withstand back-and-forth sliding motions, and therefore has a greater fatigue life in comparison with e.g. a slewing bearing.

In one example of an assembly according to the invention, the outer annular portion of the intermediate ring comprises a ring flange, which extends in a radially outward direction. The axial faces of the ring flange are then clamped to the hub by the first and second clamping members. The first and second sliding surfaces may be provided on the opposing axial faces of the flange. Alternatively, a clamping surface of the first clamping member comprises the first sliding surface of the thrust bearing and a clamping surface of the second clamping member comprises the second sliding surface.

In a further example, the hub comprises a hub flange, which extends in a radially inward direction. Suitably, the intermediate ring comprises a U-shaped section with a first leg and a second leg which surround and axially retain the hub flange. Thus, the U-shaped section of the intermediate ring constitutes the clamping means, whereby the first leg acts as the first clamping member and the second leg acts as the second clamping member. The second leg is then a separate part that can be attached with e.g. bolts in order to set the necessary clamping force. Again, the first and second sliding surfaces may be provided on axial faces of the hub flange or on the clamping surfaces of the first and second legs of the U-shaped section.

In a further development of the invention, the thrust bearing comprises a first set of bearing segments which have a sliding surface that forms the first sliding surface.

The thrust bearing further comprises a second set of bearing segments which have a sliding surface that forms the second sliding surface. Preferably, each bearing segment is made from a sliding material such as described above. The advantage of individual bearing segments is that a segment can be replaced if it becomes damaged. Furthermore, the thrust bearing becomes easier and cheaper to manufacture.

In one embodiment, the assembled bearing segments provide a continuous annular sliding surface. Each bearing segment may be formed by a curved strip of sliding material, whereby the number of segments that make up the continuous annular sliding surface is varied depending on the diameter of the annular surface. Each curved strip has a sliding side and an attachment side. The attachment side preferably comprises one or more shaped protrusions that are adapted to fit into correspondingly shaped recesses on a flange surface of the intermediate ring or hub, or on a clamping surface of the clamping members. In one example, the attachment side comprises an axial rib that extends over the full length of the curved strip, and the flange surface or clamping surface comprises a corresponding groove. Alternatively, the attachment side may comprise one or more studs. In a preferred example, the attachment side comprises both an axial rib and a stud, which provides strength as well as locking in radial direction and in the sliding direction.

In a further embodiment, the assembled bearing segments provide a discontinuous annular surface. For example, the clamping surfaces of the first and second clamping members may comprise a series of slots or openings through which the sliding surface of the bearing segments protrudes. For ease of manufacture, the bearing segments may be essentially cylindrical in shape, and the clamping members may comprise e.g. a number of pins for axial retention at the side opposite from the clamping surface. In a preferred example, the clamping surfaces comprise radially oriented slots, which are configured to receive a central section of yo-yo shaped bearing segments, which means that additional axial retention is not needed. The advantage of individual bearing segments which are mounted through slots or openings is that each segment becomes easier to replace if damaged.

To reduce friction, the bearing segments are preferably made from a material that comprises a solid lubricant such as PTFE. To further reduce friction, the sliding surface of each of bearing segment may comprise a groove or dimples for holding a grease lubricant.

In order to optimise the power output of a wind turbine generator, large wind turbines may be equipped with active stall control and active pitch control. To generate a high torque in low-to-medium wind conditions, the turbine blades are pitched into the wind, to catch as much wind as possible. If the wind speed increases and the generator is in danger of being overloaded, the blades are stalled, whereby the angle of attack of each blade is increased. In a fully stalled condition, a flat side of the blade faces directly into the wind. The range of blade angular motion that is required to optimally catch the wind and stall the blades, if necessary, is approximately 30 degrees. In other words, 15 degrees in each direction, relative to a rotational midpoint.

If the wind speed becomes too high, or if the hub rotor is to be shut down due to a failure or in order to perform maintenance, the blades are rotated to a "parked" position. In this position, the edge of each blade faces the wind. The required range of blade angular motion in is this instance is approximately 90 degrees.

Once the blades have been rotated to the appropriate angle for the wind conditions, the pitch angle of each blade is finely adjusted, to compensate for the different wind load acting on each blade as it rotates with around a main shafts axis of the hub. For example, the pitch angle of each blade is adjusted as the blade passes by the turbine tower. As a result of fine pitch adjustment, maximum power output of the generator can be maintained. In the fine adjustment range, the blades are rotatable relative to the hub through an angle of approximately 10 degrees. In other words, 5 degrees in each direction, relative to the rotational midpoint.

Thus, two modes of operation can be identified with respect to blade angular adjustment:

A first mode of operation, in which blade position is adjusted to compensate for deviations in the wind speed or to place the hub in a parked position. In this mode, the pitch angle adjustment is large (up to approximately 90 degrees) and the pitching speed relatively slow. For example, each blade may be rotated through an angle of 15 degrees in around ten seconds.

A second mode of operation, in which fine adjustment of the pitch angle occurs. In this mode, the pitch angle is small and pitching speed is high. For example, the blade may be rotated through an angle of 5 degrees in one second.

When the wind turbine is in use, pitch angle adjustment in the second mode of operation occurs more frequently than in the first mode. Typically, fine adjustment takes place once every few seconds, while the larger, positional adjustments occur only a few times an hour. In essence, the first mode of operation can be viewed as a semi-static, long-stroke angular adjustment a high-frequency, short-stroke angular adjustment. The second mode of operation can be viewed as a high-frequency, short stroke angular adjustment The first bearing arrangement according to the invention is particularly suitable for large angular adjustments in the first mode of operation. To transmit the high axial loads and support the blade bending moment, the thrust bearing has a pitch diameter than is much the same size as the blade root diameter. Consequently, for turbine blades with a large diameter of e.g. greater than 1 m, the friction torque generated may be unacceptably high for high-frequency, short-stroke adjustments.

Thus, in a further development of the invention, the rotational support of the turbine blade further comprises a second bearing arrangement which is specially adapted for high-frequency, short stroke adjustments. In the first mode of operation, the intermediate ring and the blade are rotatable relative to the hub via the first bearing arrangement. In the second mode of operation, the blade is rotatable relative to the intermediate ring and hub via the second bearing arrangement.

In a preferred example, the second bearing arrangement comprises at least three rods, whereby a first end of each rod is connected to the intermediate ring by a first swivel joint and a second end of each rod is connected to the blade by a second swivel joint.

The rods take up the axial loads and blade bending moment and transmit these to the intermediate ring. The radial loads are transmitted to the hub by a second radial bearing that is mounted to the shaft-like hub extension. Suitably, the assembly comprises a conical mounting structure with a small-diameter ring and a large-diameter ring joined by e.g. spokes. The small-diameter ring is mounted to the hub extension via the second radial bearing, which may be a dedicated radial bearing or which may be same radial bearing that supports the intermediate ring.

Suitably, the assembly further comprises first actuation means for rotating the intermediate ring relative to the hub and comprises second actuation means for rotating the blade relative to the intermediate ring. It is also possible to use a single actuator which couples the blade and hub.

A rotational support according to the invention has a long fatigue life and can be adapted to generate a relatively low friction torque in comparison with e.g. a slewing bearing. Other advantages of the present invention will become apparent from the detailed description and accompanying figures.

BRIEF DESCRIPTION OF DRAWINGS

The invention will be described in greater detail in the following, with reference the embodiments described in the figures, in which

FIG. 1b shows a perspective view of a first example of an intermediate ring suitable for use in the arrangement of FIG. 1a;

FIG. 2 shows a cut perspective view of part of a second example of an intermediate ring, thrust bearing and clamping members suitable for use in the arrangement of FIG. 1a;

FIG. 3b shows a perspective view of part of the assembly of FIG. 3a;

FIG. 4 shows a cross-section of a further embodiment of an assembly according to the invention.

MODES FOR CARRYING OUT THE INVENTION

The embodiments of the invention with further developments described in the following are to be regarded only as examples and are in no way to limit the scope of the protection provided by the patent claims.

Figure 1A:
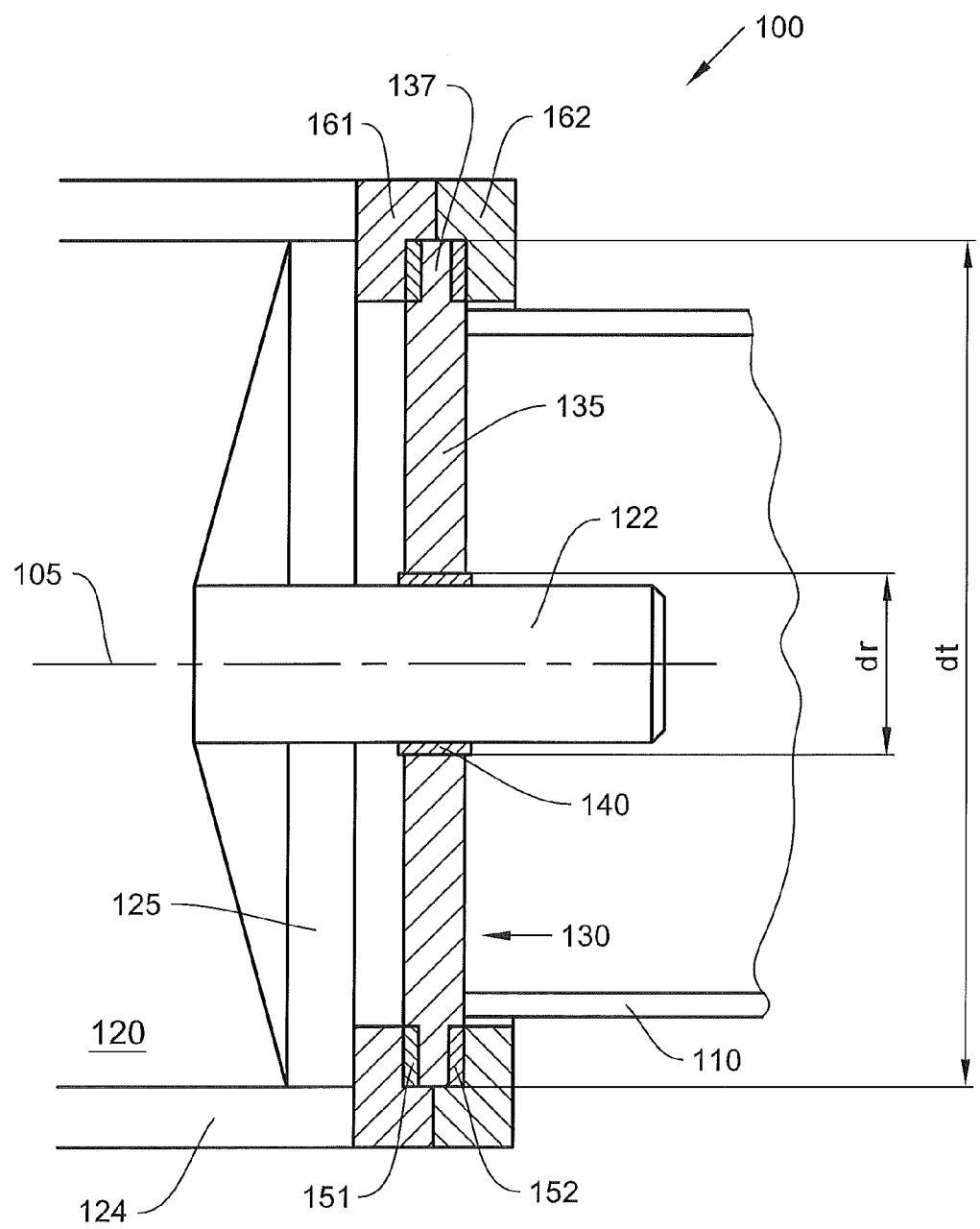
FIG. 1a shows a schematic cross-section of a first embodiment of an assembly according to the invention for rotational support of a wind turbine blade relative to a hub, the rotational support comprising an intermediate ring, a thrust bearing and clamping members.

FIG. 1a shows a schematic cross-section of a first embodiment of an assembly 100 according to the invention, adapted for rotational support of a wind turbine blade 110, relative to a wind turbine hub 120. The hub itself is mounted on a main shaft, which has a main shaft axis perpendicular to an axis 105 of the rotational support. The generator of the wind turbine is centred on the main shaft axis, which is driven when the hub 120 is caused to rotate by wind striking blades attached to the hub. Typically, a wind turbine comprises three blades.

Figure 1B:
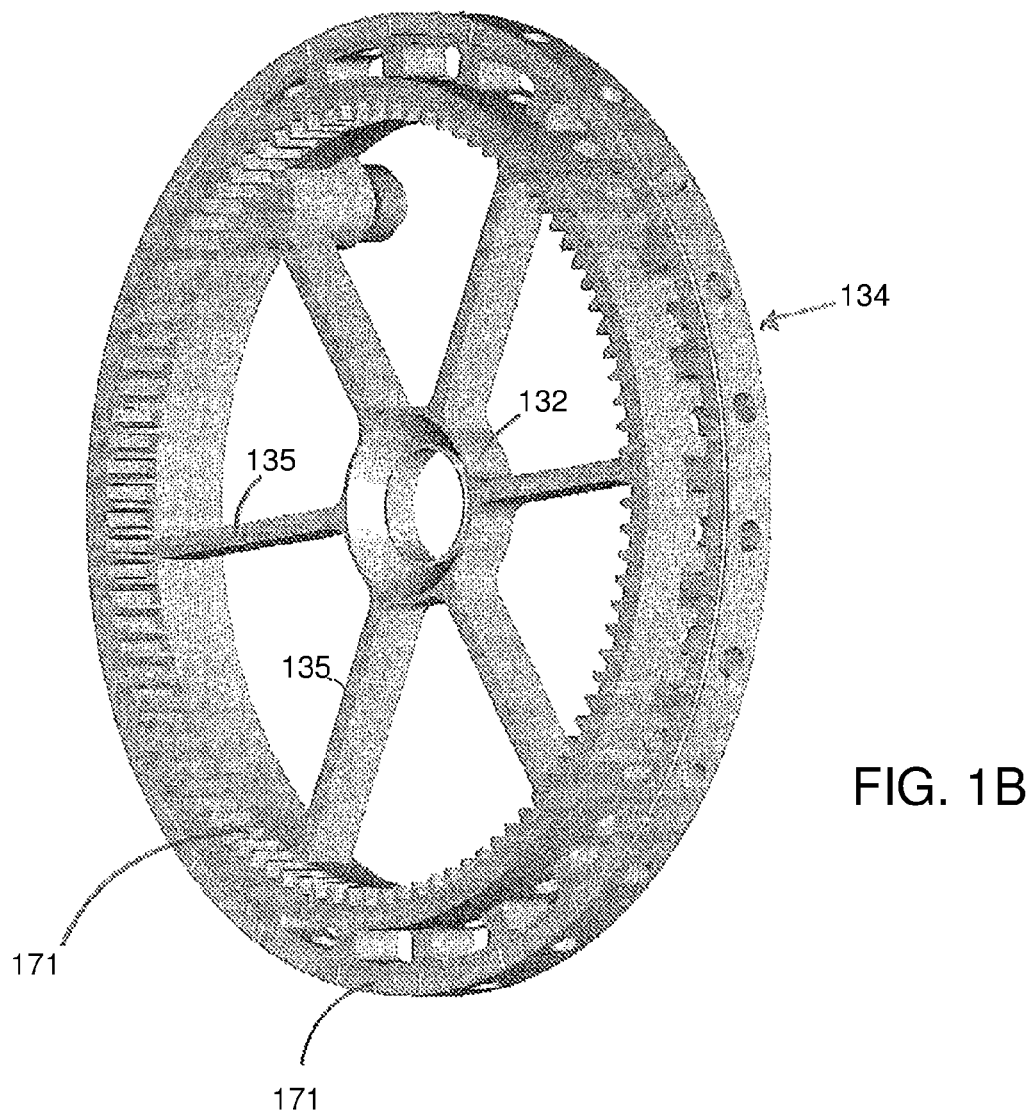

The assembly comprises an intermediate ring 130, mounted between an arm 124 of the hub and the blade 110. A perspective view of an example of the intermediate ring is shown in FIG. 1b. The intermediate ring has an inner annular portion 132 and an outer annular portion 134, which are connected by a number of ring spokes 135. The blade 110 is attached to the intermediate ring 130 at a side of the outer annular portion by means of e.g. 80 bolts. The intermediate ring 130 is mounted to the hub via a first bearing arrangement, such that the ring 130 and blade 110 are rotatable relative to the hub 120, to enable adjustment of blade pitch angle. The first bearing arrangement comprises a radial bearing 140 for supporting the radial load of the blade 110 and a thrust bearing 151, 152 for supporting the axial load of the blade and blade bending moment.

The hub 120 comprises a shaft-like extension 122 which is connected to the hub arm 124 via a number of hub spokes 125. According to the invention, the inner annular portion 132 of the intermediate ring is mounted to the shaft-like extension 122 via the radial bearing 140, and the outer annular portion 134 of the intermediate ring is mounted to the hub arm 124 via the thrust bearing. The thrust bearing comprises a first sliding surface and a second sliding surface which are clamped to the hub by a first clamp member 161 and a second clamp member 162. To enable driven rotation of the intermediate ring 130, gear teeth 171 are provided at an inner circumference of the outer annular portion 134.

The invention is partly based on the understanding that in use of the wind turbine, the axial load and bending moment that need to be transmitted from the blade 110 to the hub 120 via the rotational support are considerably higher than the radial loads. An assembly according to the invention therefore enables the radial bearing 140 to be optimised in terms of the radial load and enables the thrust bearing 151, 152 to be optimised in terms of the axial load and bending moment. In the embodiment shown in FIG. 1a, the radial bearing 140 is a plain bushing with a pitch diameter $d_r$. The thrust bearing 151, 152 has a pitch diameter $d_t$. In view of the lower radial loads, the pitch diameter $d_r$ of the radial bearing 140 may be relatively small in comparison with the pitch diameter $d_t$ of the thrust bearing. In many applications, $d_r$ is at least fives times smaller than $d_t$. Preferably, $d_{radial}$ is as small as possible, in order to minimise friction torque when the intermediate ring 130 is rotated.

Figure 1C:
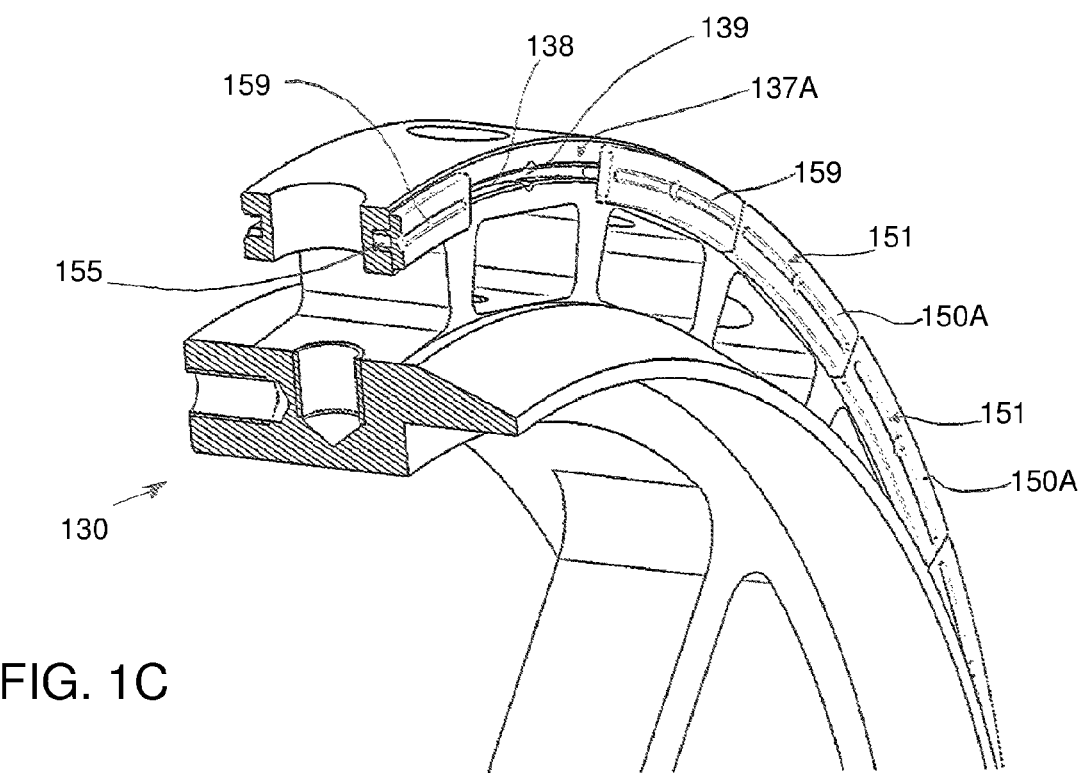
FIG. 1c shows a cut perspective view of part of the intermediate ring from FIG. 1b, including part of the thrust bearing.
Figure 8:
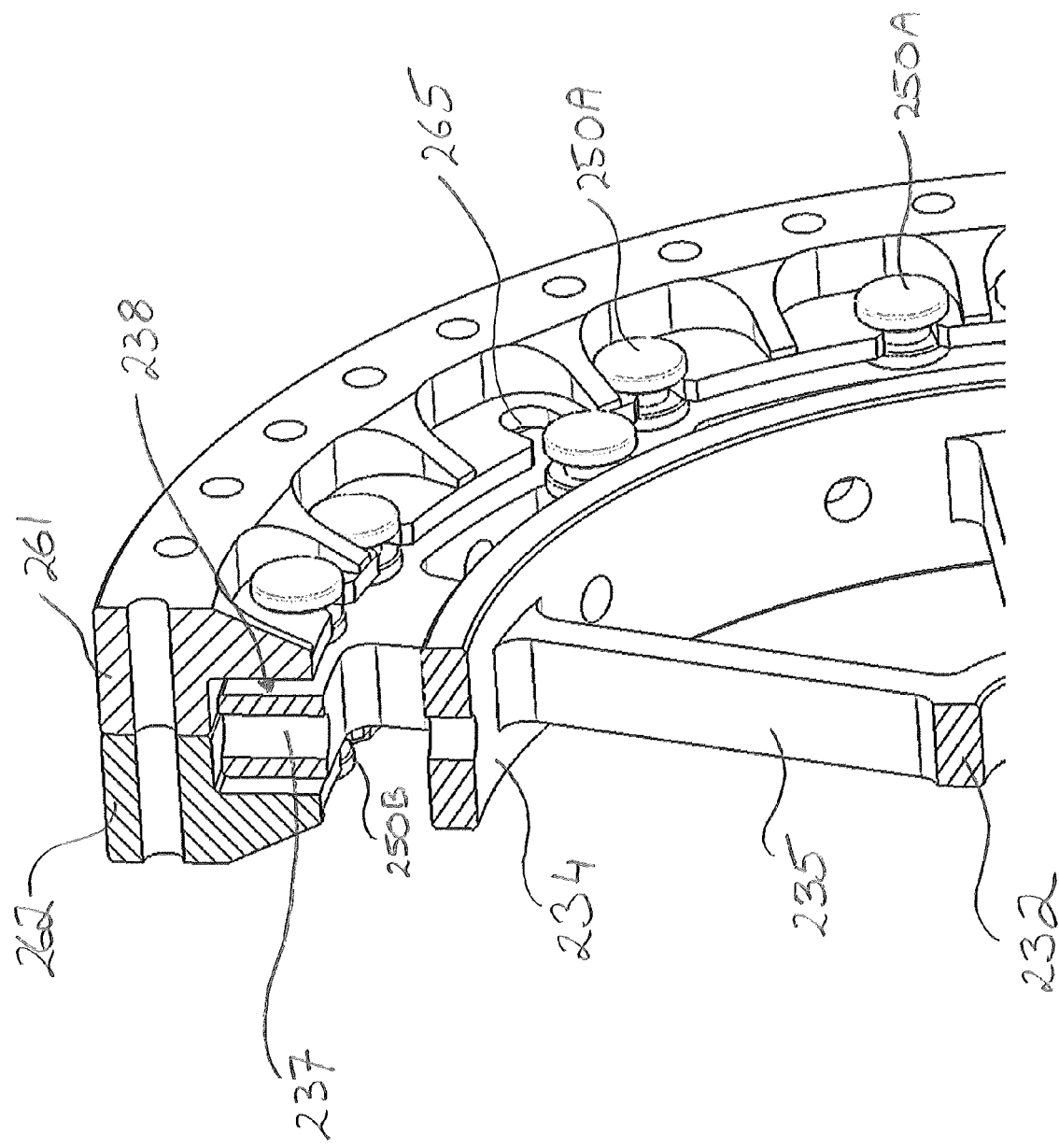

The thrust bearing 151, 152 requires greater load-carrying capacity and therefore has a pitch diameter than is substantially the same size as a root diameter of the blade. In the depicted embodiment, the outer annular portion 134 of the intermediate ring 130 has a ring flange 137 that extends in a radially outward direction. The first sliding surface is provided on a first axial face of the ring flange 137 and the second sliding surface is provided on a second axial face of the ring flange. A more detailed view of the intermediate ring and the first sliding surface is shown in FIG. 1c. The first sliding surface of the thrust bearing is formed by the sliding surface of a first set of bearing segments 150A. Each bearing segment 150A is a curved strip of sliding material, whereby the assembled segments form a continuous annular sliding surface. The second sliding surface is formed by the sliding side of a second set of curved strips made of sliding material. The sliding material is suitably a polymer-reinforced fibre material such as PA 6.6, with 15% PTFE to enhance low-friction behaviour, and with 30% glass fibres, to enhance strength and stiffness. Such a material is also highly wear-resistant and thus suited to withstand the back-and-forth motions associated with blade pitch adjustments.

To secure the thrust bearing to the ring flange 137, each bearing segment has a protrusion that fits into a corresponding recesses in an axial surface 137A of the ring flange 137. In the depicted embodiment, the protrusion comprises a central rib 155 that extends over the full length of each curved strip 150A. The protrusion further comprises a stud that fits into a circular opening 139 in the ring flange surface 137A. Due to the combination of the rib and stud, the segments are locked in radial direction and in the sliding direction. Furthermore, the sliding surface of each curved strip may comprise a reservoir for lubricant, such as a groove 159 or a plurality of dimples. The second set of bearing segments are executed and attached to the second axial surface of the ring flange in an identical manner.

The thrust bearing 151, 152 is therefore easy to assemble and, together with the radial bearing 140, forms a rotational support for the blade 110 that can be readily adapted for the expected application loads.

In an alternative embodiment, a first and second set of curved strips as described above are respectively provided on a first clamping surface and on a second clamping surface of the first and second clamping members 161, 162.

In a still further embodiment, the first and second sliding surfaces are provided on the clamping surfaces of the first and second clamping members, by means of a first set and a second set of bearing segments, which, when assembled, form a discontinuous annular sliding surface. An example of such an embodiment is shown in FIG. 2.

The intermediate ring again comprises an inner annular portion 232 and an outer annular portion 234 which are connected by ring spokes 235. The outer annular portion comprises a flange 237 that extends in a radially outward direction and has a first axial surface 238 which faces towards the hub and a second axial surface that faces towards the blade. The ring flange is clamped to the hub by a first clamp ring 261 and a second clamp ring 262. The first clamp ring comprises a series of radial slots 265 for receiving a first set of individual sliding pads 250A, which have a central cylindrical section with the same width as the width of each radial slot. 265. At opposite ends of the central cylindrical section, each pad 250A further has disk-shaped sections with a larger diameter than the central cylindrical section. Thus, each pad 250A is shaped like a yo-yo in this example. Again, each pad is made from a strong, wear-resistant and low-friction material, such as PA 6.6 with 15% PTFE and 30% glass fibres. The second clamp ring 262 comprises an identical set of radial slots for receiving a second set of individual sliding pads 250B which have a second sliding surface in contact with the second axial surface of the ring flange 237.

The individual sliding pads are easy to mount and dismount, meaning that an individual sliding pad is easy to replace if the sliding surface becomes damaged. This an advantage over the embodiment depicted in FIGS. 1b and 1c. The advantage of a series of bearing segments that form a continuous annular sliding surface is that each segment may have a smaller radial height and may have a smaller axial thickness, which enhances stiffness.

The maximum range of angular motion that is required for a wind turbine blade relative to the hub is approximately 90 degrees. As mentioned, the sliding surfaces of the thrust bearing are highly wear-resistant and are suited to back and forth angular motions within this range. For fine pitch adjustments which occur on a frequent basis, the first bearing arrangement may generate an unacceptably high degree of friction torque, particularly in the case of large wind turbines.

Figure 3A:
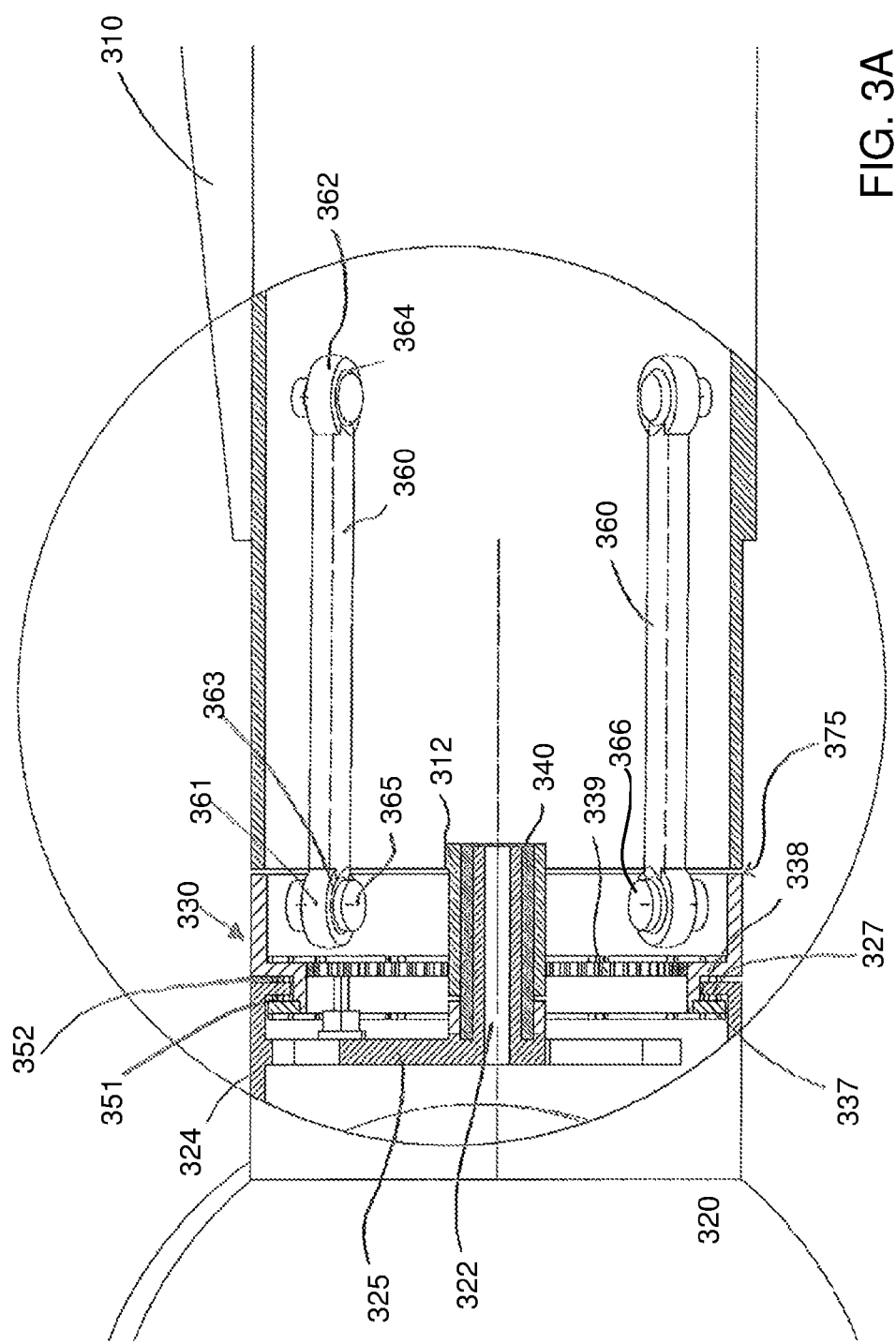
FIG. 3a shows a cross-section of a second embodiment of an assembly according to the invention.

Thus, in a further development, the rotational support of the turbine blade comprises a second bearing arrangement that is optimally adapted for high frequency, short-stroke angular adjustment of approximately 5 degrees back an forth. An example of an assembly comprising such a rotational support is shown in FIGS. 3a and 3b.

The assembly comprises an intermediate ring 330 that is supported relative to the hub 320 by a first bearing arrangement comprising a first radial bearing and a thrust bearing 351, 352, as described previously. As best shown in FIG. 3b, the intermediate ring 330 comprises an inner annular section 332, and an outer annular section 334 which are connected by a plurality of ring spokes 335. As before, the hub 320 comprises a central shaft-like extension 322, which may be connected to the hub arm 324 via a plurality of hub spokes 325. The inner annular section 332 of the intermediate ring is mounted to the hub extension 322 via the radial bearing, which in the depicted example is a plain bushing 340.

The thrust bearing 351, 352 transmits the axial load exerted on the intermediate ring by the blade to the hub. In the depicted example, an end of the hub arm 324 is provided with an inwardly extending flange 327. The outer annular portion 334 of the intermediate ring comprises a U-shaped section, whereby the hub flange 327 is retained between a first leg 337 and a second leg 338 of the U-shaped section. The first sliding surface of the thrust bearing is provided on the first leg 337 and the second sliding surface is provided on the second leg 338, which sliding surfaces are in contact with the hub flange 327.

In the depicted embodiment, the first and second sliding surfaces are provided on a first and second set of individual sliding pads, as best shown in FIG. 1b. In this figure, a side 355 of the first pads, opposite from the first sliding surface is visible. The first pads are mounted through openings in the first leg 337 of the U-shaped section; the second pads are mounted through openings in the second leg 338. As mentioned, the advantage of individual sliding pads is that the pads can be replaced if the sliding surface becomes worn.

Suitably, the first leg 337 of the U-shaped section is a separate part that is connected to the intermediate ring 330, after the blade and intermediate ring have been mounted over the hub extension 322. The second leg can be connected with a suitable preload or clearance, which is sufficient to axially retain the hub flange 327 between the legs of the U-section, but which allows rotation of the intermediate ring 330 (together with the blade) relative to the hub 320. Thus, the first and second legs of the U-shaped section respectively act as first and second clamping members.

For rotating the intermediate ring, the intermediate ring 330 is provided in this example with a ring gear 339. Instead of a complete ring gear, a toothed segment may also be provided. Suitably, the ring gear is driven by actuation means comprising e.g. a long-stroke motor with a pinion gear 390 on the output shaft. The actuation means may further comprise a second long-stroke motor with a second pinion gear, whose teeth engage with a different section of the ring gear 339, or with a second toothed segment. Other types of actuation means are also possible.

For fine pitch adjustments of the blade relative to the hub, the assembly is provided with a second bearing arrangement. In the depicted example, the second bearing arrangement comprises a radial bearing, which is the same bushing 340 that supports the inner annular portion 332 of the intermediate ring. Suitably, the blade comprises a central tube-like extension 312, or is mounted to the intermediate ring via a mounting structure with a tube like extension 312 that is then supported by the bushing 340. The mounting structure is preferably conical in shape, whereby the blade root is attached to a large-diameter end of the conical mounting structure. The large-diameter end is connected to the tube-like extension via a plurality of arms, which transmit the radial loads on the blade to the hub extension 322 via the bushing 340.

The axial loads are transmitted from the blade 310 to the intermediate ring 330 via three rods 360. A first end 361 of each rod is attached to an inner circumference of the outer annular section 334 of the intermediate ring, by means of a first swivel joint 363. A second end 362 of each rod is attached to an inner circumference of the blade or blade mounting structure by means of a second swivel joint 364. Suitably, the three first swivel joints and the three second swivel joints are spaced at equal intervals on the intermediate ring and blade respectively. (Only one first and second swivel joints have been given a reference numeral in FIG. 3a, so as not to obscure the drawing).

In the depicted example, the first and second swivel joints 363, 364 are spherical plain bearings. An inner circumference of each first and second rod end is in sliding contact with an outer circumference of corresponding first attachment heads 365 on the intermediate ring 330 and second attachment heads 366 on the blade. The radius of contact in each swivel joint is small in relation to rod length, which has the advantage that a low friction torque is generated.

The first and second swivel joints 363, 364 allow rotation of the rods 360 in two degrees of freedom, meaning that the blade 310 is able to rotate relative to the intermediate ring by a limited amount. Three rod connections are advantageous, as this arrangement is statically determinate. Typically the joints are designed to allow an angular adjustment of approx. 5 degrees in each direction. The relative angular displacement also causes an axial displacement of the blade relative to the intermediate ring. Suitably, the blade is mounted to the intermediate ring with a certain axial gap 375 in between, to allow for this axial displacement. A gap of e.g. 10 mm is sufficient when the rods 360 have a length of approximately two meters.

For rotating the blade 310 relative to the intermediate ring 330, the assembly comprises second actuation means. In the depicted example, the second actuation means comprises a short-stroke motor with a pinion gear 380 on the output shaft. In FIG. 3a, which shows a perspective view of the assembly without the blade, the motor should be imagined as being attached to the blade; for example, on an arm of the conical mounting structure. The teeth of the pinion gear of the short-stroke motor engage with a segment of the ring gear 339 on the intermediate ring.

A further example of a rotational support according to the invention, comprising a first bearing arrangement with a plain thrust bearing and a second bearing arrangement with swiveling rod supports, is shown in FIG. 4. The intermediate ring 430 is mounted on the hub extension 422 via a bushing 440. An outer annular portion of the intermediate ring has a ring flange, on which the first and second sliding surfaces of the thrust bearing are provided, as described with reference to FIGS. 1a-1c. In this example, the second bearing arrangement comprises a dedicated radial bearing 445. The blade (not shown) is mounted to the hub and intermediate ring via a conical mounting structure 470. The small diameter end of the mounting structure 470 is mounted to the hub extension via the radial bearing 445, which is a non-located spherical plain bearing in this example. The large-diameter end of the mounting structure 470 comprises a series of attachment heads for the second end of each rod 460, while the intermediate ring is provided with a series of attachment heads for the first end of each rod.

The intermediate ring 430 again comprises a ring gear 439 to enable driven rotation of the intermediate ring for relatively large pitch-angle adjustments. Fine pitch adjustments are made using a linear actuator 480. The actuator is mounted to e.g. a spoke of the mounting structure 470 and the output piston is connected to a stud on the intermediate ring. The advantage of a linear actuator and corresponding connection is that the connection is less prone to wear than engaging gear teeth.

In this example, the second bearing comprises 24 rods which interconnect the blade mounting structure 470 and intermediate ring 430 via first and second swivel joints. The advantage of using more than three rod supports is that each rod 460 and swivel joint may have a smaller diameter, which allows the use of standard components. A disadvantage of more than 3 connections is that the arrangement is overdetermined, meaning that there is a risk that the load will not be evenly distributed over each rod. To counteract this drawback, the length of each rod is adjustable, which helps ensure that when the blade is attached, each rod takes up a uniform share of the load.

The invention is not to be regarded as being limited to the embodiments described above, a number of additional variants and modifications being possible within the scope of the subsequent patent claims.

The invention claimed is:

1. An assembly for rotationally supporting a wind turbine blade relative to a wind turbine hub, the assembly comprising an intermediate ring having an inner annular portion and an outer annular portion provided with means for attaching the turbine blade,
   whereby the intermediate ring is rotatably mounted to the hub via a first bearing arrangement, characterized in that the first bearing arrangement comprises a radial bearing and a thrust bearing,
   wherein the inner annular portion is mounted to the hub via the radial bearing and the outer annular portion is mounted to the hub via the thrust bearing, and
   wherein the thrust bearing comprises first and second sliding surfaces which are clamped to the hub between first and second clamping members.

2. The assembly according to claim 1, wherein the radial bearing has a pitch diameter that is at least fives times smaller than a pitch diameter ($d_t$) of the thrust bearing.

3. The assembly according to claim 1, wherein the hub comprises a hub flange extending in a radially inward direction and the intermediate ring comprises a U-shaped section, whereby a first leg of the U-shaped section forms a first clamping member and a second leg of the U-shaped section forms a second clamping member.

4. The assembly according to claim 1, wherein the intermediate ring comprises a ring flange extending in a radially outward direction, which ring flange is clamped by the first and second clamping members.

5. The assembly according to claim 1, wherein the thrust bearing comprises a first set of bearing segments, which have a sliding surface that forms a first sliding surface of the thrust bearing, and further comprises a second set of bearing segments which have a sliding surface that forms a second sliding surface of the thrust bearing.

6. The assembly according to claim 5, wherein the bearing segments are made of a fibre-reinforced polymer material.

7. The assembly according to claim 6, wherein the bearing segments are provided on a clamping surface of the first and second clamping members, whereby the clamping surface has openings through which the sliding surface of the bearings segments protrude.

8. The assembly according to claim 7, wherein the bearing segments have a circular sliding surface.

9. The assembly according to claim 5, wherein the bearing segments provide a continuous annular sliding surface.

10. The assembly according to claim 9, wherein the bearing segments are formed by curved strips of sliding material, each strip having an attachment side comprising one or more shaped protrusions.

11. The assembly according to claim 10, wherein the curved strips are provided on an axial surface of a clamping member or on an axial surface of the hub or on an axial surface of the intermediate ring, and
   wherein the axial surface comprises correspondingly shaped recesses for receiving the one or more protrusions of each curved strip.

12. The assembly according to claim 10, wherein the one or more shaped protrusions comprises a stud and/or a rib that extends over the full length of the curved strip.

13. The assembly according to claim 5, wherein the sliding surface of each bearing segment is provided with a channel or dimples for holding a lubricant.

14. The assembly according to claim 1, further comprising a second bearing arrangement for rotatably supporting the blade relative to the intermediate ring.

15. The assembly according to claim 14, wherein the second bearing arrangement comprises at least three rods, whereby a first end of each rod is in connection with the intermediate ring by a first swivel joint and a second end of each rod is in connection with blade via a second swivel joint.

16. The assembly according to claim 15, wherein the blade is supported on a shaft extension of the hub by a second radial bearing.

\* \* \* \* \*